May 29, 1923.
A. E. JOHNSON
1,456,600
TURNSOLE FITTING MACHINE
Filed March 22, 1920
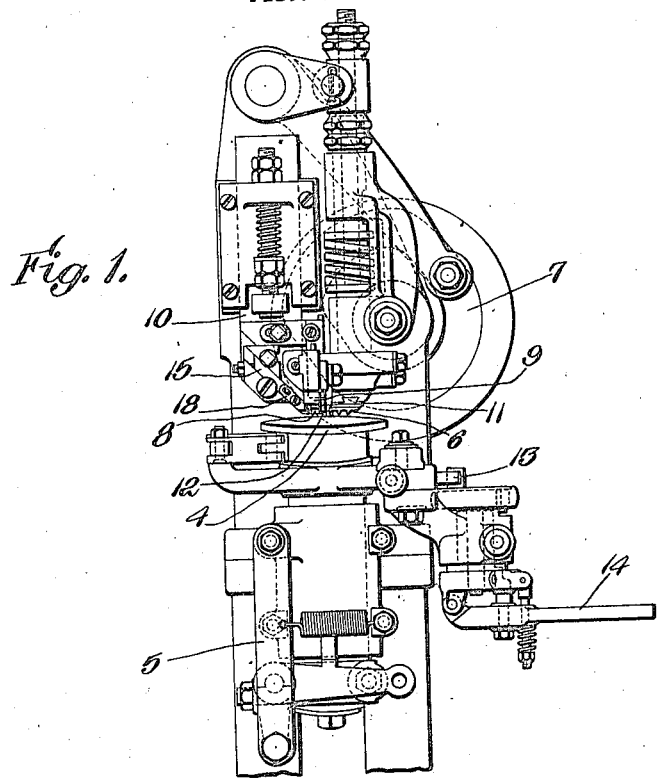
Fig. 1.
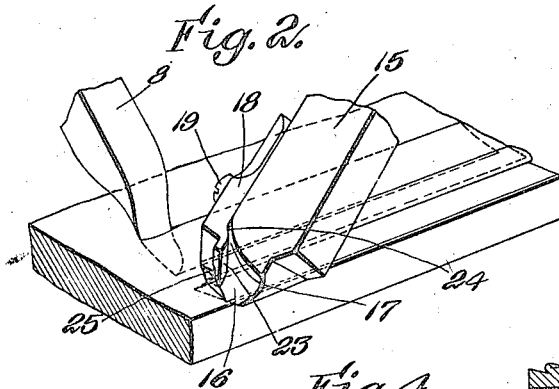
Fig. 2.
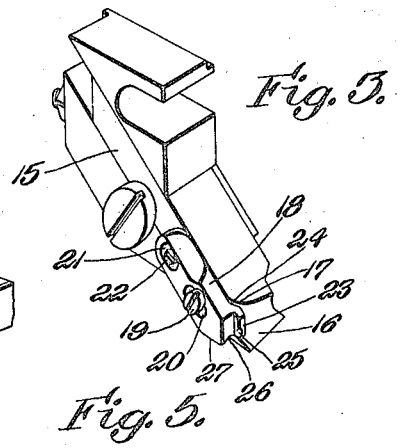
Fig. 3.
Fig. 5.
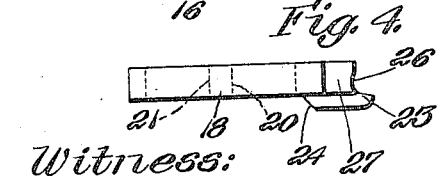
Fig. 4.
Witness:
Alfred H. McGlinchey.
Inventor:
Albert E. Johnson
by his attorneys Patented May 29, 1923.

1,456,600

UNITED STATES PATENT OFFICE.

ALBERT E. JOHNSON, OF BEVERLY, MASSACHUSETTS, ASSIGNOR TO UNITED SHOE MACHINERY CORPORATION, OF PATERSON, NEW JERSEY, A CORPORATION OF NEW JERSEY.

TURNSOLE-FITTING MACHINE.

Application filed March 22, 1920. Serial No. 367,745.

*To all whom it may concern:*

Be it known that I, ALBERT E. JOHNSON, a citizen of the United States, residing at Beverly, in the county of Essex and State of Massachusetts, have invented certain new and useful Improvements in Turnsole-Fitting Machines; and I do hereby declare the following to be a full, clear, and exact description of the invention such as will enable others skilled in the art to which it appertains to make and use the same.

This invention relates to turn sole fitting machines and more particularly to such machines for fitting turn soles of the type disclosed in Letters Patent of the United States No. 1,200,114, granted October 3, 1916 to Albert E. Johnson.

An important feature of the turn sole disclosed in said Johnson patent resides in the formation of a shallow marginal channel which produces a thin wedge shaped lip to be folded over on the between substance and thus build up a substantial striking shoulder at the inner edge of the shallow channel.

The object of the present invention is to provide an effective device for turning back the marginal lip and ironing it down on the between substance, during the operation of fitting the turn sole with the lip and the usual parallel channel flap.

This object is accomplished by providing the edge or lip forming knife, which takes the place of the usual turn work shoulder knife, with a tool arranged adjacent the inner corner of its cutting blade, so formed as to deflect the lip being cut inward and direct it to a horizontal position. The inward direction of movement of the lip rolls it over the between substance and the lip turning tool is provided with a surface arranged parallel to, and at a proper height above, the face of the sole which acts to iron and set the lip in place as the sole is advanced by the feed mechanism of the machine. In the turn sole moulding machine (Johnson Patent No. 1,307,820, June 24, 1919) through which the sole is passed after the fitting operation, the lip and built up shoulder receive a final setting and consolidating pressure.

The invention is especially applicable to channeling machines of the economy type such as disclosed in Letters Patent of the United States No. 984,773, granted February 21, 1911 to William C. Meyer as improved for making turn soles by the features disclosed in the present inventor's application for stock fitting machines Serial No. 289,879, filed April 14, 1919. Since the novel feature of the present invention does not depend wholly on the disclosure in said application it will, for brevity of description and ease of explanation be illustrated as applied to the economy channeling machine of said Meyer patent.

The preferred form of the invention is illustrated in the accompanying drawings, in which:

Figure 1 is an end elevation of the channeling machine disclosed in said patent to Meyer; Fig. 2 is a perspective of a portion of a turn sole being fitted by the channeling tools forming the novel feature of the present invention; Fig. 3 is a perspective of the edge knife block, supporting the edge knife and lip turning and setting tool, removed from the machine; Fig. 4 is a bottom view of the lip turning and setting tool, detached; and Fig. 5 is a cross section of a turn sole, of the type hereinbefore described, after it has been fitted by the machine.

In the embodiment of the invention illustrated in the drawings, referring first to Fig. 1, the work support 4 with its supporting toggle 5; the four-motion feed plate 6 with its operating cam 7; the channeling knife 8 carried by the knife block 9 on the knife slide 10; the presser foot 11; the edge gage 12 operated by the lever 13 through adjustments of the handle 14; and all intermediate operating connections for said parts; all may be, and preferably are, the same as like parts in said patent to Wililiam C. Meyer, No. 984,773, except that the channeling knife 8 is shaped for producing an oblique channel cut, and the presser foot 11 is mounted to yield independently of the knife slide 10 as is required in making turn soles and as disclosed in the application hereinbefore referred to.

The novel feature of the present invention resides in the provision of a lip turning and setting tool which cooperates with the new edge or lip knife 15 to lay the marginal lip formed by said knife (see Fig. 3) on the between substance during the sole fitting operation and thus produce the improved turn sole disclosed in said Johnson Patent No. 1,200,114 as more particularly illustrated in Fig. 5. To this end the inner corner of the lip knife shank adjacent the cutting blade 16 is beveled or otherwise cut away as at 17 to receive the overlying forward end of the lip turning and setting tool 18. This tool may conveniently be secured in position by a headed set screw 19 threaded into the side of the knife shank through a longitudinal slot 20 in the tool. A second slot 21 in the tool takes over a headless positioning screw 22 also threaded into the side of the knife shank. The tool 18 is provided with an offset shoulder forming a lip turning plow 23 located directly above the knife blade 16 (see Figs. 3 and 4). This shoulder has a bevel 24 at its back abutting the bevel 17 on the knife shank and a recess 25 at its inner side which merges into the upper surface of the blade 16 through being concaved about a substantially horizontal axis. Adjacent the recess 25 is another recess 26 in the forward end of the tool concaved about a substantially vertical axis, the two recesses together forming a continuous curved wall leading from the lip cutting edge of the knife 15 for deflecting the lip into a horizontal position over the between substance of the sole. The bottom face 27 of the tool 18, to the rear of the recess 26, lies in a plane above the inner and lower corner of the knife blade such that it is above and parallel to the surface of the between substance. The recess 26 merges into the bottom face 27 so that the lip, as it is folded over by the plow, passes beneath this face. The construction is such that the face 27 acts as an ironing tool to set the lip folded beneath it in position on the between substance.

The function of the slot 20 in the tool 18 is to permit a variation in the height of the lip setting face 27 above the between substance. The lip knife 15 is formed so as to make a downward and inward cut the depth of which at its base is less than the depth of the usual shoulder producing a relatively thin wedge shaped lip all as described in said Johnson Patent No. 1,200,114. Different weights of turn soles, however, require that the depth of the outer channel be greater or less with a consequent variation in the thickness of the lip, later turned over on the between substance. The height of the lip setting face 27 should be adjustable, therefore, in order to bear with the correct pressure on all thicknesses of lip that may be cut. If the pressure from the setting face 27 is too great, difficulty will be experienced in feeding the sole through the machine, and if too light the lip will not retain its position over the between substance. In Fig. 3 the tool is shown as adjusted for a lip of medium thickness.

The lip forming, turning and setting operations all occur in sequence while the sole is being fed through the sole fitting machine with the result that an accurate positioning of the lip on the between substance is insured. Furthermore, because the sole is in temper when channeled, the lip is pliable and can easily be turned to its new position without danger of splitting or cracking, a trouble frequently encountered in lip turning as a separate operation when the sole has been allowed to dry, a condition too often prevalent. The importance of the position of the lip turning plow 23 above the lip cutting blade of the edge knife is emphasized. This location of the plow provides for an immediate deflection of the wedge-shaped lip in the proper direction as soon as it is severed from the sole, with a pressure applied to the base of the wedge where the strength of the lip lies. The outer channel, from which the lip is cut, is so shallow that the lip has practically no body and in order to turn it successfully it must be lifted from the channel by pressure along its line of attachment to the sole where some resistance is offered.

The nature and scope of the invention having been indicated and its preferred embodiment having been specifically described, what is claimed as new, is:—

1. In a machine for preparing turn soles of the type having an inwardly cut marginal channel lip, in combination, a channel lip forming knife, and a tool located at the inner side of the shank of said knife having an offset shoulder overlying the cutting blade of said knife provided with a concave lip engaging end acting to turn the lip inward over the between substance of the sole as it is fed.

2. A channeling and lip-turning machine comprising, in combination, sole supporting and feeding means, a knife to operate on soles supported thereby, and a lip-turning tool adjustably mounted on the knife and having a portion overlying its cutting edge to deflect the flap formed thereby.

3. A channeling and lip-turning machine comprising, in combination, sole supporting and feeding means, a channel knife, a lip-forming knife cutting longitudinally of the work and opposite the channel knife with its cutting edge transverse to the direction of feed, and a lip-turning device carried by the lip-forming knife on the side next the channel knife and having a portion formed to engage the lip progressively as it is cut and deflect it substantially 180°, to lay it on the top of the sole.

ALBERT E. JOHNSON.